United States Patent
Kuroki et al.

(10) Patent No.: US 9,598,084 B2
(45) Date of Patent: Mar. 21, 2017

(54) VEHICLE TRAVEL CONTROLLER

(71) Applicants: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/439,060

(22) PCT Filed: Oct. 31, 2012

(86) PCT No.: PCT/JP2012/078227
§ 371 (c)(1),
(2) Date: Apr. 28, 2015

(87) PCT Pub. No.: WO2014/068719
PCT Pub. Date: May 8, 2014

(65) Prior Publication Data
US 2015/0291171 A1   Oct. 15, 2015

(51) Int. Cl.
*B60W 30/18* (2012.01)
*B60W 10/18* (2012.01)
(Continued)

(52) U.S. Cl.
CPC ....... *B60W 30/18072* (2013.01); *B60T 7/042* (2013.01); *B60T 7/12* (2013.01);
(Continued)

(58) Field of Classification Search
CPC ...... B60W 10/02; B60W 10/06; B60W 10/18; B60W 10/187; B60W 10/188;
(Continued)

(56) References Cited

U.S. PATENT DOCUMENTS 5,607,209 A * 3/1997 Narita ................. B60T 8/17616
303/122.11
5,961,418 A 10/1999 Taniguchi et al.
(Continued)

FOREIGN PATENT DOCUMENTS

JP   5 79364       3/1993
JP   H10-181388    7/1998
(Continued)

OTHER PUBLICATIONS

International Search Report Issued Dec. 4, 2012 in PCT/JP12/078227 Filed Oct. 31, 2012.
(Continued)

*Primary Examiner* — Nicholas Kiswanto
(74) *Attorney, Agent, or Firm* — Oblon, McClelland, Maier & Neustadt, L.L.P.

(57) ABSTRACT

A running control device of a vehicle executes a normal running mode with an engine coupled to drive wheels, a first inertia running mode with the engine stopped during running and an engine brake force reduced as compared to the normal running mode, and a second inertia running mode
(Continued)

| RUNNING MODE | ENGINE 12 | CLUCH C1 | ENGINE BRAKE FORCE | NEGATIVE PRESSURE SUPPLY |
|---|---|---|---|---|
| ENGINE BRAKE RUNNING | DRIVEN ROTATION | ENGAGED | LARGE | PRESENT |
| FREE-RUN INERTIA RUNNING | F/C; ROTATION STOP | RELEASED | SMALL | ABSENT |
| NEUTRAL INERTIA RUNNING | IDLE ROTATION | RELEASED | SMALL | PRESENT | with the engine rotating during running and the engine brake force reduced as compared to the normal running mode. A determining portion determines a necessity of a brake negative pressure during the first or second inertia running mode. The necessity of the brake negative pressure is a condition for returning from the first inertia running mode and the second inertia running mode to the normal running mode. An upper limit value of the necessity of the brake negative pressure for returning from the first inertia running mode is smaller than that for returning from the second inertia running mode.

4 Claims, 10 Drawing Sheets

(51) Int. Cl.
*B60W 10/115* (2012.01)
*B60T 7/04* (2006.01)
*B60T 7/12* (2006.01)
*B60T 13/66* (2006.01)
*B60T 17/02* (2006.01)
*B60T 17/22* (2006.01)
*B60W 10/02* (2006.01)
*B60W 10/06* (2006.01)
*B60W 10/184* (2012.01)
*B60W 10/188* (2012.01)
*F02D 13/06* (2006.01)
*F02D 29/02* (2006.01)
*F02D 41/12* (2006.01)
*F16H 61/21* (2006.01)

(52) U.S. Cl.
CPC ............ *B60T 13/662* (2013.01); *B60T 17/02* (2013.01); *B60T 17/22* (2013.01); *B60W 10/02* (2013.01); *B60W 10/06* (2013.01); *B60W 10/18* (2013.01); *B60W 10/184* (2013.01); *B60W 10/188* (2013.01); *B60W 30/18136* (2013.01); *F02D 13/06* (2013.01); *F02D 29/02* (2013.01); *F02D 41/12* (2013.01); *F02D 41/123* (2013.01); *F16H 61/21* (2013.01); *B60T 2201/022* (2013.01); *B60W 2030/1809* (2013.01); *B60W 2510/18* (2013.01); *B60W 2540/12* (2013.01); *F02D 2200/501* (2013.01); *F02D 2200/502* (2013.01); *F02D 2250/41* (2013.01); *Y02T 10/18* (2013.01)

(58) Field of Classification Search
CPC ......... B60W 10/18136; B60W 10/196; B60W 10/198; B60W 30/18072; B60T 7/042; B60T 7/12; B60T 13/52; B60T 13/662; B60T 17/02; B60T 17/22; F02D 13/06; F02D 29/02; F02D 41/12; F02D 41/123; F02D 9/06; F02D 2009/0228; F16H 61/21

See application file for complete search history.

(56) References Cited

U.S. PATENT DOCUMENTS

| | | | |
|---|---|---|---|
| 6,679,214 B2* | 1/2004 | Kobayashi | B60K 6/485 123/179.4 |
| 6,742,850 B1* | 6/2004 | Eckert | B60T 7/042 180/170 |
| 6,754,579 B2* | 6/2004 | Kamiya | B60W 10/06 477/203 |
| 8,394,001 B2 | 3/2013 | Tsutsui et al. | |
| 2007/0102208 A1 | 5/2007 | Okuda et al. | |
| 2011/0245005 A1 | 10/2011 | Tsutsui et al. | |
| 2011/0256981 A1* | 10/2011 | Saito | B60W 10/06 477/183 |
| 2011/0270501 A1 | 11/2011 | Ito et al. | |
| 2012/0010047 A1 | 1/2012 | Strengert et al. | |
| 2013/0179053 A1 | 7/2013 | Matsunaga | |
| 2015/0006045 A1 | 1/2015 | Motozono et al. | |
| 2015/0149058 A1 | 5/2015 | Kim et al. | |
| 2015/0166065 A1 | 6/2015 | Kuroki et al. | |
| 2015/0166066 A1* | 6/2015 | Suzuki | F02N 11/0833 477/174 |
| 2015/0191172 A1 | 7/2015 | Kim | |
| 2015/0274168 A1 | 10/2015 | Kuroki et al. | |
| 2015/0307103 A1* | 10/2015 | Kuroki | F16H 61/21 701/70 |
| 2016/0084376 A1 | 3/2016 | Kim et al. | |

FOREIGN PATENT DOCUMENTS

| | | |
|---|---|---|
| JP | 2002 227885 | 8/2002 |
| JP | 2005-226701 | 8/2005 |
| JP | 2011 173475 | 9/2011 |
| JP | 2012 77647 | 4/2012 |
| JP | 2012 101636 | 5/2012 |
| JP | 2012 121417 | 6/2012 |
| WO | 2011 135725 | 11/2011 |
| WO | 2014 068722 | 5/2014 |

OTHER PUBLICATIONS

Office Action issued in U.S. Appl. No. 14/414,593 on Apr. 8, 2016.
Notice of Allowance issued in U.S. Appl. No. 14/414,593 on Nov. 10, 2016.

* cited by examiner

| RUNNING MODE | ENGINE 12 | CLUCH C1 | ENGINE BRAKE FORCE | NEGATIVE PRESSURE SUPPLY |
|---|---|---|---|---|
| ENGINE BRAKE RUNNING | DRIVEN ROTATION | ENGAGED | LARGE | PRESENT |
| FREE-RUN INERTIA RUNNING | F/C; ROTATION STOP | RELEASED | SMALL | ABSENT |
| NEUTRAL INERTIA RUNNING | IDLE ROTATION | RELEASED | SMALL | PRESENT |

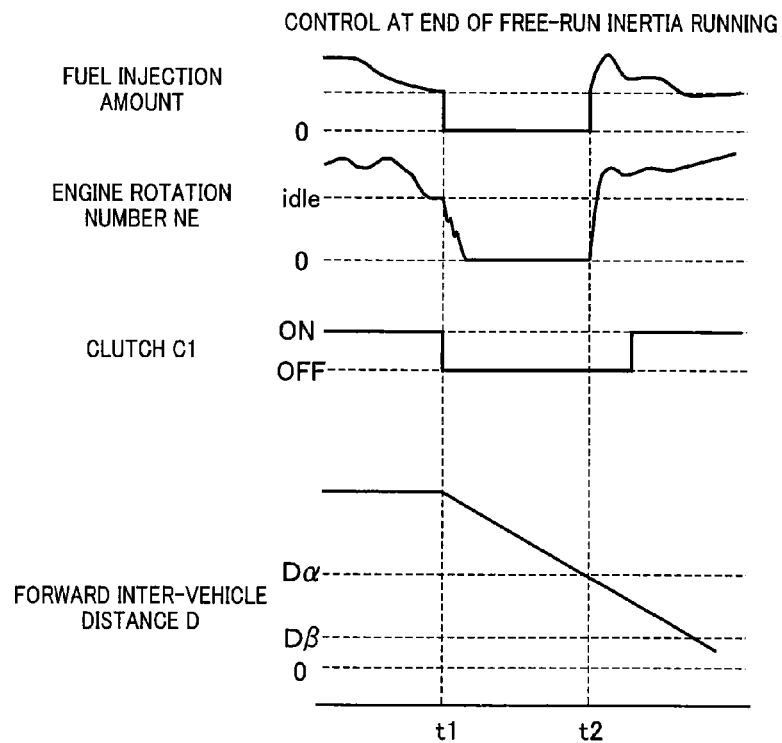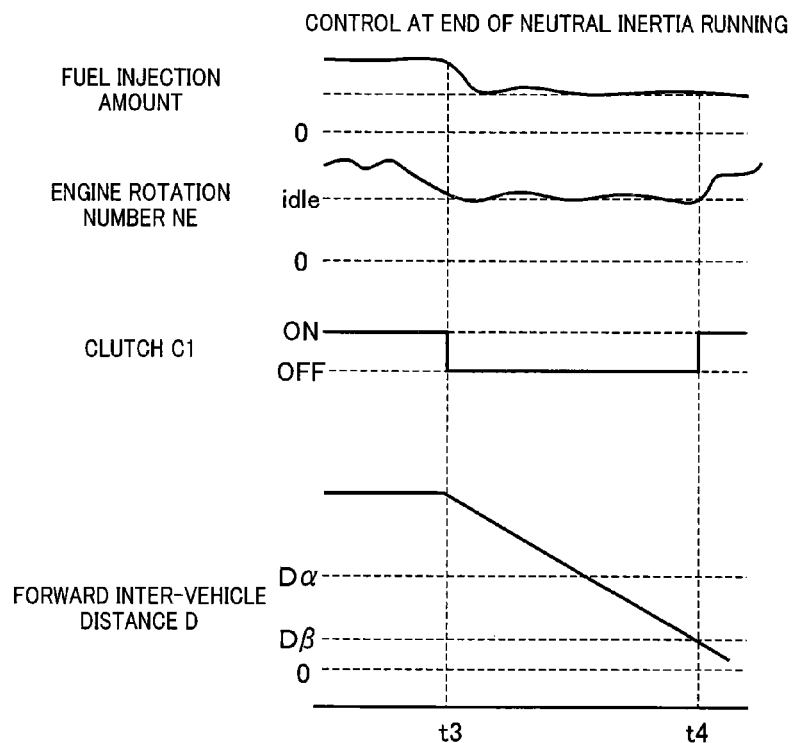

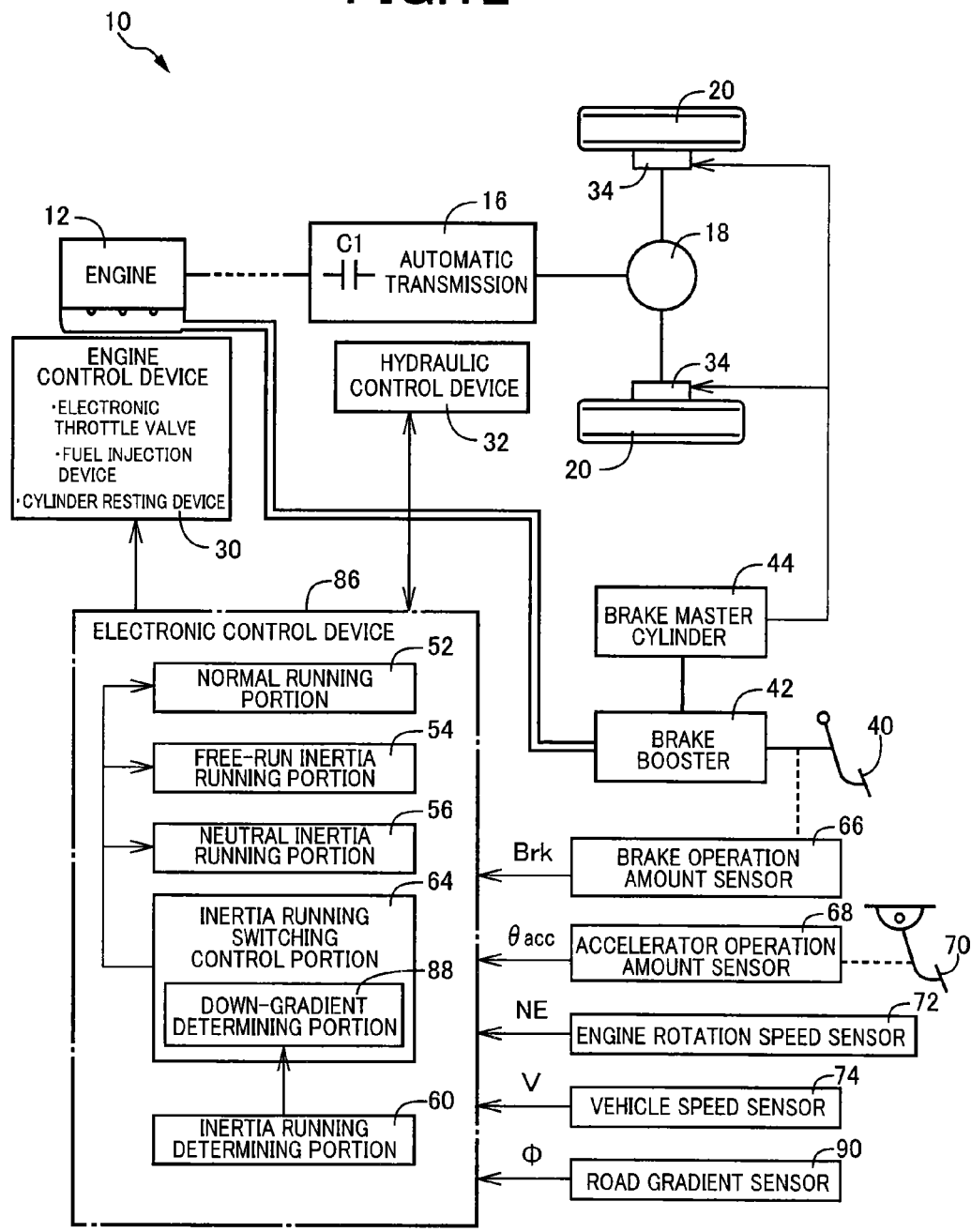

VEHICLE TRAVEL CONTROLLER

TECHNICAL FIELD

The present invention relates to a running control device of a vehicle and particularly to a technique of satisfying improvements in vehicle fuel consumption and drivability at the same time during an inertia running mode in a vehicle capable of executing an inertia running mode performed with an engine brake force made lower than that of an engine brake running mode.

BACKGROUND ART

With regard to a normal running mode (engine brake running mode) performed with engine brake applied by driven rotation of an engine while power transmission between the engine and drive wheels is coupled, an inertia running mode performed with an engine brake force made lower than that of the normal running mode is conceived for extending a running distance and improving fuel consumption of a vehicle. A device described in Patent Document 1 is an example thereof and, if it is determined that an accelerator pedal returning operation is performed during running of a vehicle, a clutch disposed in a power transmission path between an engine and drive wheels is released to start the inertia running mode, thereby improving vehicle fuel consumption. The inertia running mode performed in Patent Document 1 has no distinction between an inertia running mode performed with a clutch released while engine rotation is stopped and an inertia running mode performed while an engine is kept rotating.

PRIOR ART DOCUMENT

Patent Document

Patent Document 1: Japanese Laid-Open Patent Publication No. 2002-227885

SUMMARY OF THE INVENTION

Problem to be Solved by the Invention

The inertia running mode of a vehicle is considered to include a first inertia running mode performed with the engine stopped during running and the engine brake force reduced as compared to the normal running mode and a second inertia running mode performed with the engine kept rotating during running and the engine brake force reduced as compared to the normal running mode, and the first inertia running mode is advantageous in terms of fuel consumption since the engine is stopped.

However, the vehicle as described above includes a brake booster amplifying a brake force of a brake device by using a negative pressure generated in an intake pipe due to rotation of the engine. Therefore, for example, when braking is required, the negative pressure used by the brake booster, i.e., a brake negative pressure, cannot be ensured in the first inertia running mode because the engine is stopped. On the other hand, although the brake negative pressure can be ensured since the engine is rotating, the second inertia running mode has a problem that vehicle fuel consumption deteriorates except when braking is required since the engine is kept operating. If the brake booster includes a negative pressure tank, a brake force amplifying function is not immediately lost even if the engine is stopped; however, the negative pressure is consumed by each brake operation and the amplifying function is reduced.

The present invention was conceived in view of the situations and it is therefore an object of the present invention to provide a running control device of a vehicle capable of both the improvement in vehicle fuel consumption and the ensuring of a brake negative pressure when braking is required during an inertia running mode of a vehicle.

Means for Solving the Problem

To achieve the object, the present invention provides a running control device of a vehicle (a) including an engine and a brake booster amplifying a brake force by using a brake negative pressure generated by rotation of the engine, (b) the running control device of a vehicle executing a normal running mode with the engine coupled to drive wheels, a first inertia running mode with the engine stopped during running and an engine brake force reduced as compared to the normal running mode, and a second inertia running mode with the engine kept rotating during running and the engine brake force reduced as compared to the normal running mode, the running control device of a vehicle comprising a determining portion configured to determine a necessity of the brake negative pressure during the first or second inertia running mode, the necessity of the brake negative pressure being included as at least one of conditions for returning from the first inertia running mode and the second inertia running mode to the normal running mode, (c) the running control device of a vehicle having an upper limit value of the necessity of the brake negative pressure for returning from the first inertia running mode set smaller than an upper limit value of the necessity of the brake negative pressure for returning from the second inertia running mode.

Effects of the Invention

According to the running control device of a vehicle as configured above, an upper limit value of the necessity of the brake negative pressure for returning from the first inertia running mode is set smaller than an upper limit value of the necessity of the brake negative pressure for returning from the second inertia running mode. Therefore, since the second inertia running mode with the engine rotated is performed when the necessity of the brake negative pressure is relatively large, the engine rotates when braking is required, thereby ensuring the brake negative pressure. When the necessity of the brake negative pressure is relatively small, the first inertia running mode with the engine stopped can be performed and, therefore, the inertia running mode can be performed with good fuel consumption. As a result, the vehicle fuel consumption can be improved and the brake negative pressure can be ensured when braking is required at the same time during the inertia running mode of the vehicle.

Preferably, (a) the determining portion determines a necessity of the brake negative pressure such that the necessity of the brake negative pressure is larger as a distance to a preceding vehicle is closer, such that (b) the necessity of the brake negative pressure is larger as a down-gradient is larger on a road surface where the vehicle is running, or such that (c) the necessity of the brake negative pressure is larger as a vehicle speed is larger when the vehicle is running. Therefore, the determining portion determining the necessity of the brake negative pressure can predict a frequency of subsequent brake input by a driver during the inertia running mode from the distance to the preceding vehicle, the down-gradient on a road surface or the vehicle speed and can preferably ensure the stability of the brake input at the time of braking.

Preferably, (a) the first inertia running mode is a free-run inertia running mode that is an inertia running mode performed by disconnecting the engine and the drive wheels and stopping the engine during running, and (b) the second inertia running mode is a neutral inertia running mode that is an inertia running mode performed by disconnecting the engine and the drive wheels and operating the engine in a self-sustaining manner during running. Therefore, since the engine and the drive wheels are disconnected during the free-run inertia running mode and the neutral inertia running mode, the engine brake force is almost eliminated and the running distance in the inertia running mode is preferably extended.

Preferably, since (a) the first inertia running mode is a free-run inertia running mode that is an inertia running mode performed by disconnecting the engine and the drive wheels and stopping the engine during running, and (b) the second inertia running mode is a cylinder resting inertia running mode performed by stopping a fuel supply to the engine with the engine coupled to the drive wheels and stopping operation of at least one of a piston and intake/exhaust valves in a part of multiple cylinders of the engine, in both the free-run inertia running mode and the cylinder resting inertia running mode, engine brake force is reduced as compared to the normal running mode and therefore, the running distance in the inertia running mode is preferably extended.

Preferably, the necessity of the brake negative pressure is a magnitude of a negative pressure required for satisfying an amplification effect of the brake booster at the time of a predetermined brake operation, and the vehicle returns from the inertia running mode to the normal running mode based on the upper limit value of the magnitude of the negative pressure.

Preferably, (a) if the necessity of the brake negative pressure becomes larger during the first inertia running mode than the upper limit value of the necessity of the brake negative pressure for returning from the first inertia running mode, the vehicle returns from the first inertia running mode to the normal running mode, (b) while if the necessity of the brake negative pressure becomes larger during the second inertia running mode than the upper limit value of the necessity of the brake negative pressure for returning from the second inertia running mode, the vehicle returns from the second inertia running mode to the normal running mode, and therefore, the brake negative pressure can preferably be ensured when braking is required during the inertia running mode of the vehicle.

Preferably, (a) if the necessity of the brake negative pressure becomes larger during the first inertia running mode than the upper limit value of the necessity of the brake negative pressure for returning from the first inertia running mode, the vehicle returns from the first inertia running mode to the second inertia running mode, (b) while if the necessity of the brake negative pressure becomes larger during the second inertia running mode than the upper limit value of the necessity of the brake negative pressure for returning from the second inertia running mode, the vehicle returns from the second inertia running mode to the normal running mode. Therefore, for example, when the necessity of the brake negative pressure becomes larger than the upper limit value of the necessity of the brake negative pressure for returning from the first inertia running mode, the engine brake force is reduced as compared to the normal running mode while the necessity of the brake negative pressure is between the upper limit value of the necessity of the brake negative pressure for returning from the first inertia running mode and the upper limit value of the necessity of the brake negative pressure for returning from the second inertia running mode as compared to the case of returning from the first inertia running mode to the normal running mode and, therefore, the vehicle fuel consumption is preferably improved during the inertia running mode of the vehicle.

Although the present invention is preferably applicable to a vehicle including at least an engine as a drive force source and is preferably applied to, for example, a vehicle with the power of the engine transmitted via an automatic transmission to drive wheels, the present invention is also applicable to a hybrid vehicle including an electric motor or a motor generator as a drive force source in addition to an engine. The engine may be an internal combustion engine generating power from combustion of fuel.

A clutch device is preferably disposed between the engine and the drive wheels to connect and disconnect the power transmission path therebetween such that the engine can be separated from the drive wheels. Although this clutch device is preferably implemented by using a hydraulic friction engagement device, for example, a hydraulic clutch, disposed in series with the power transmission path, clutches of various types can be employed, including electrically controlling a reaction force to connect and disconnect the power transmission. A forward clutch is also usable in an automatic transmission including pluralities of clutches and brakes and having a plurality of available shift stages. The clutch device connecting and disconnecting the power transmission path may be made up of, for example, a planetary gear device inserted in the power transmission path and having a pair of rotating elements connected to the power transmission path and a hydraulic brake preventing rotation of the rotating elements other than those connected to the power transmission path out of the rotating elements of the planetary gear device. If the automatic transmission is a belt type continuously variable transmission, a forward friction engagement device and a backward friction engagement device of a forward/backward switching mechanism disposed thereon are used as the clutch device. If the automatic transmission is a parallel shaft type constant-mesh transmission, a sleeve of a synchronous mechanism disposed thereon and an actuator driving the transmission correspond to the clutch device.

Preferably, start conditions of the free-run inertia running mode and the neutral inertia running mode are that, for example, a returning operation of an accelerator pedal is performed to an original position or a position close thereto in a relatively high-speed steady running state in which the power transmission path from the engine to the drive wheels is connected by the clutch with the shift stage of the automatic transmission set to a forward stage equal to or greater than a predetermined high-speed shift stage at the vehicle speed V equal to or greater than a predetermined vehicle speed V1.

Preferably, the free-run inertia running mode and the neutral inertia running mode are discontinued for switching to the engine brake running mode or another running mode when at least one of determination conditions of the relatively high-speed steady running state is no longer satisfied and/or when a brake operation is performed.

Preferably, non-start condition or discontinuation condition of the free-run inertia running mode set as an independent condition may be that warm-up is requested because an engine water temperature is equal to or less than a predetermined temperature, that an oil pressure must be supplied to a hydraulic control equipment such as a hydraulic friction engagement device, or that an alternator disposed on the engine must generate electricity for a battery. This is for the purpose of preferentially switching to the neutral inertia running mode, the engine brake running mode, etc. driving the engine to rotate so as to perform warm-up or battery charge.

BRIEF DESCRIPTION OF THE DRAWINGS

FIG. 10 is a time chart corresponding to the control operation of FIG. 9 and depicts the case of returning from the free-run inertia running mode to the normal running mode because the inter-vehicle distance becomes equal to or less than the inter-vehicle distance determination value for returning from the free-run inertia running mode during the free-run inertia running mode.

FIG. 11 is a time chart corresponding to the control operation of FIG. 9 and depicts the case of returning from the neutral inertia running mode to the normal running mode because the inter-vehicle distance becomes equal to or less than the inter-vehicle distance determination value for returning from the neutral inertia running mode during the neutral inertia running mode.

FIG. 12 is a diagram for indicating an electronic control device of a vehicle drive device indicative of yet another example of the present invention, and corresponds to FIGS. 1 and 7.

MODE FOR CARRYING OUT THE INVENTION

An example of the present invention will now be described in detail with reference to the drawings.

FIRST EXAMPLE

Figure 1:
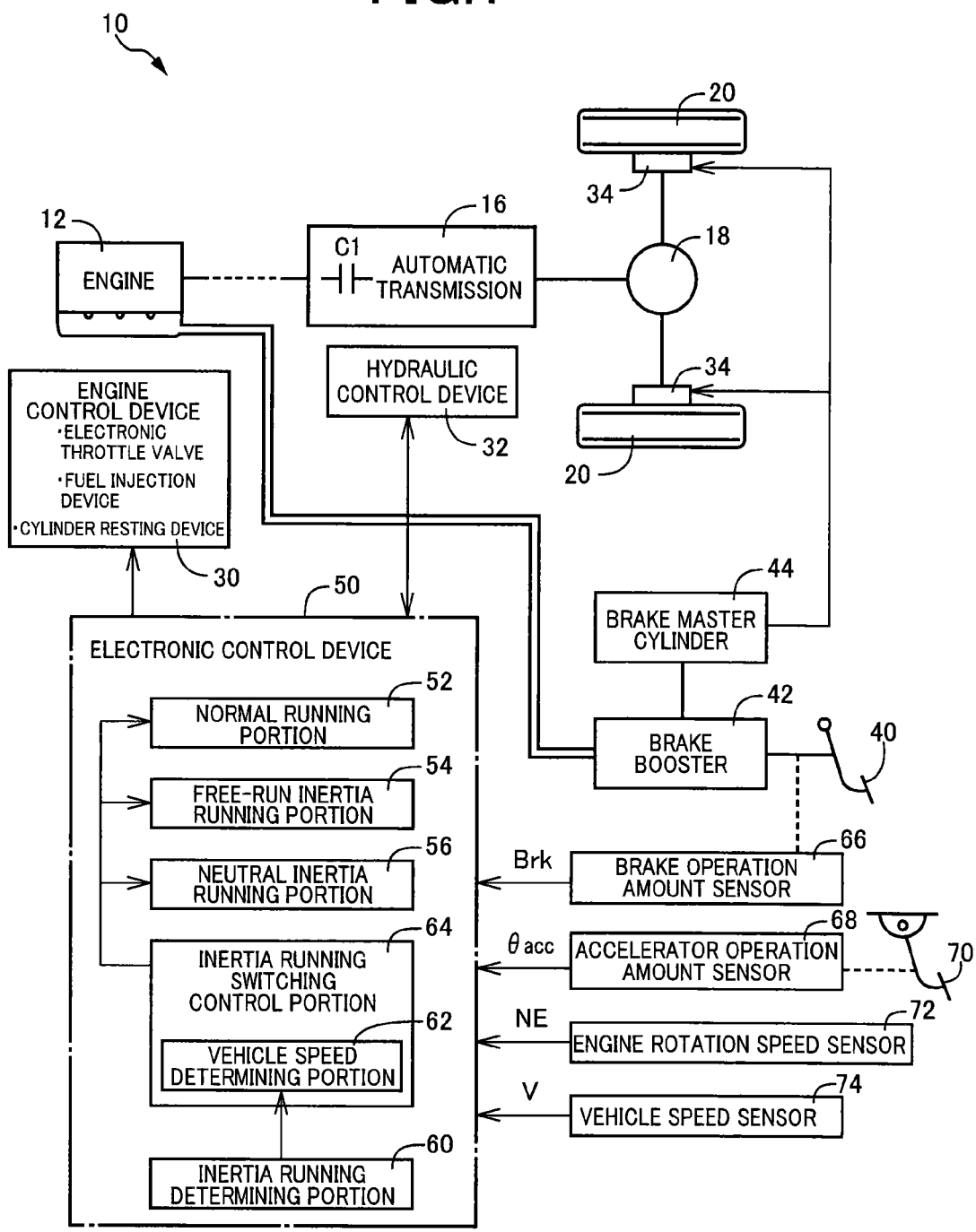
FIG. 1 is a schematic configuration diagram of a vehicle drive device to which the present invention is preferably applied and a main portion of a control function of an electronic control device.

FIG. 1 is a schematic configuration diagram of a vehicle drive device 10 to which the present invention is preferably applied and a main portion of a control function of an electronic control device 50 corresponding to a running control device thereof. The vehicle drive device 10 includes as a drive force source an engine 12 that is an internal combustion engine such as a gasoline engine and a diesel engine generating power from combustion of fuel, and the output of the engine 12 is transmitted from an automatic transmission 16 via a differential gear device 18 to left and right drive wheels 20. A damper device and a power transmission device such as a torque converter may be disposed between the engine 12 and the automatic transmission 16, and a motor generator acting as a drive force source can also be disposed therebetween.

The engine 12 includes an engine control device 30 having various pieces of equipment necessary for output control of the engine 12, such as an electronic throttle valve and a fuel injection device, and a cylinder resting device. The electronic throttle valve and the fuel injection device control an intake air amount and a fuel supply amount, respectively, and are basically controlled depending on an operation amount of an accelerator pedal 70, i.e., an accelerator opening degree θacc, corresponding to an output request amount of a driver. The fuel injection device can stop the fuel supply (perform a fuel cut F/C) at the time of accelerator-off when the accelerator opening degree θacc is zero even during running of the vehicle. The cylinder resting device can mechanically separate intake/exhaust valves of some or all of multiple cylinders, for example, eight cylinders, from a crankshaft by a clutch mechanism etc. to stop the valves such that all the intake/exhaust valves are in a closed valve state or an opened valve state, for example. As a result, since a pumping loss is reduced when the engine 12 is driven to rotate in the fuel cut state, an engine brake force is reduced and a running distance in an inertia running mode can be extended. Pistons may be separated from the crankshaft and stopped instead of stopping the intake/exhaust valves.

The automatic transmission 16 is a stepped automatic transmission of a planetary gear type etc., having a plurality of gear stages with different gear ratios e established depending on engaged/released states of a plurality of hydraulic friction engagement devices (clutches and brakes) and is subjected to shift control by electromagnetic hydraulic control valves, switching valves, etc. disposed in a hydraulic control device 32. A clutch (clutch device) C1 acts as an input clutch of the automatic transmission 16 and is also subjected to engagement/release control by the hydraulic control device 32. The clutch C1 corresponds to a connecting/disconnecting clutch connecting and disconnecting the power transmission path between the engine 12 and the drive wheels 20. The automatic transmission 16 may be implemented by using a parallel shaft type constant-mesh stepped transmission or a continuously variable transmission of a belt type etc. with a forward/backward switching gear mechanism. In the case of the parallel shaft type constant-mesh stepped transmission, the power transmission path is released by releasing meshing of a synchronous meshing device thereof by using an actuator and, in the case of the continuously variable transmission, the power transmission path is released by releasing forward and backward friction engagement devices included in the forward/backward switching gear mechanism.

The drive wheels 20 include wheel brakes 34 and a braking force is generated depending on a brake operation force (stepping force) Brk of a brake pedal 40 subjected to a stepping operation by a driver. The brake operation force Brk corresponds to a brake request amount and, in this example, a brake oil pressure is generated from a brake master cylinder 44 mechanically via a brake booster 42 depending on the brake operation force Brk so that the braking force is generated by the brake oil pressure. The brake booster 42 amplifies the brake operation force Brk by using a brake negative pressure (negative pressure) generated by rotation of the engine 12, and the brake oil pressure output from the brake master cylinder 44 is amplified such that a large braking force is acquired.

The vehicle drive device 10 configured as described above includes an electronic control device 50. The electronic control device 50 includes a so-called microcomputer having a CPU, a ROM, a RAM, an I/O interface, etc., to execute signal processes in accordance with a program stored in advance in the ROM, while utilizing a temporary storage function of the RAM. The electronic control device 50 is supplied with a signal indicative of the brake operation force Brk (kPa) from a brake operation amount sensor 66 and is supplied with a signal indicative of the accelerator opening degree $\theta acc$ (%) that is an operation amount of the accelerator pedal 70 from an accelerator operation amount sensor 68. The electronic control device 50 is also supplied with a signal indicative of a rotation speed NE (rpm) of the engine 12 from an engine rotation speed sensor 72 and a signal indicative of a vehicle speed V (km/h) from a vehicle speed sensor 74. Other various pieces of information necessary for various controls are also supplied.

The electronic control device 50 provides the output control and rotation stop control of the engine 12 in accordance with the accelerator opening degree $\theta acc$ and the brake operation amount corresponding to a driver's acceleration intention, the shift control of controlling the shift stage of the automatic transmission 16 based on a request output based on the accelerator opening degree $\theta acc$ corresponding to a driver's acceleration intention, or based on the accelerator opening degree $\theta acc$ and the vehicle speed V, from a shift diagram stored in advance. In an inertia running state with the accelerator opening degree $\theta acc$ of zero, a predetermined gear stage is established in the automatic transmission 16 depending only on the vehicle speed V etc., and the clutch C1 is retained in an engaged state. In this engine brake running mode, the engine 12 is driven to rotate at a predetermined rotation speed determined depending on the vehicle speed V and the gear ratio e and the engine brake force having a magnitude corresponding to the rotation speed is generated. Since the engine 12 is driven to rotate at a predetermined rotation speed, an amplification effect to the brake operation force Brk is appropriately acquired from the brake booster 42 using the brake negative pressure generated from the engine rotation, and the control performance of the braking force from the brake operation is sufficiently acquired.

Figures 2, 3:
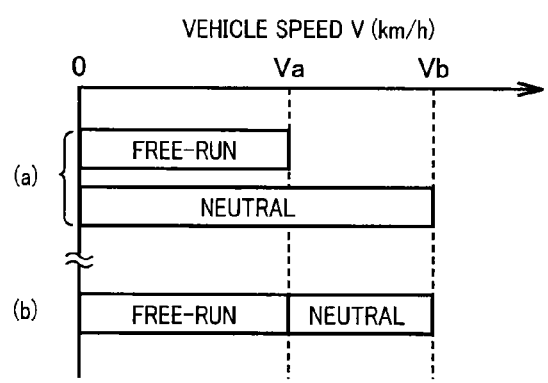
FIG. 2 is a diagram for explaining three modes of inertia running related to the present invention out of the inertia running performed by the vehicle drive device of FIG. 1.
FIG. 3 is a diagram for explaining a relationship between two modes of inertia running returned from inertia running in relation to a vehicle speed in an inertia running switching control of the electronic control device of FIG. 1, i.e. a neutral inertia running mode and a free-run inertia running mode.

The electronic control device 50 also includes a normal running portion 52, a free-run inertia running portion 54, a neutral inertia running portion 56, an inertia running determining portion 60, and an inertia running switching control portion 64 having a vehicle speed determining portion 62. The normal running portion 52 performs a normal running mode (hereinafter also referred as "normal running") with the clutch C1 engaged to couple the power transmission path between the engine 12 and the drive wheels 20 during running. At the time of accelerator-off, the normal running portion 52 performs an engine brake running mode (hereinafter also referred as "engine brake running") with an engine brake generated by a pumping loss and a friction torque from driven rotation of the engine 12 as depicted in FIG. 2. During the engine brake running mode, the engine 12 may be in a fuel cut F/C state in which the fuel supply is stopped; however, in this example, the engine 12 is controlled to be in an idling state in which a minimum amount of fuel is supplied as is the case with a neutral inertia running mode (hereinafter also referred as "neutral inertia running") described later.

The free-run inertia running portion 54 performs a free-run inertia running mode (hereinafter also referred as "free-run inertia running") (first inertia running mode) by releasing the clutch C1 while the rotation of the engine 12 is stopped during an inertia running mode by performing the fuel cut F/C at the time of the returning operation of the accelerator pedal 70. In this case, since the engine brake force becomes smaller than that of the engine brake running mode and the release of the clutch C1 results in the engine brake force of substantially zero, a reduction in running resistance extends the running distance in the inertia running mode, and fuel consumption can be improved. The neutral inertia running portion 56 performs the neutral inertia running mode (second inertia running mode) by releasing the clutch C1 while the rotation of the engine 12 is maintained during an inertia running mode without performing the fuel cut F/C at the time of the returning operation of the accelerator pedal 70. Also in this case, since the engine brake force becomes smaller than that of the engine brake running mode and the release of the clutch C1 results in the engine brake force of substantially zero, a reduction in running resistance extends the running distance in the inertia running mode, and fuel consumption can be improved; however, fuel is necessary for maintaining the rotation speed of the engine 12 at the time of accelerator-off. The rotation speed NE of the engine 12 at the time of the neutral inertia running mode, i.e., at the time of returning of the accelerator pedal 70 is an idle rotation speed of about 700 rpm after warm-up, for example, and is a rotation speed of about 1200 rpm during warm-up or during charging, for example.

The inertia running determining portion 60 determines a satisfaction of an inertia running start condition that, for example, a returning operation of the accelerator pedal 70 is performed to an original position or a position close thereto in a relatively high-speed steady running state in which the power transmission path from the engine 12 to the drive wheels 20 is connected by the clutch C1 with the shift stage of the automatic transmission 16 set to a forward stage equal to or greater than a predetermined high-speed shift stage at the vehicle speed V (km/h) equal to or greater than a predetermined speed, and determines a type of the inertia running mode as the free-run inertia running mode or the neutral inertia running mode, i.e., determines whether a type of the inertia running mode is the free-run inertia running mode, from a state of the engine 12 and a state of the clutch C1 depicted in FIG. 2, for example.

The vehicle speed determining portion 62 determines whether the vehicle speed V detected by the vehicle speed sensor 74 is larger than a preset vehicle speed determination value Va and whether the vehicle speed V detected by the vehicle speed sensor 74 is larger than a preset vehicle speed determination value Vb. The vehicle speed determination value Va is an upper limit value of the vehicle speed V set in advance by, for example, an experiment, for returning from the free-run inertia running mode to the normal running mode during the free-run inertia running mode, while the vehicle speed determination value Vb is an upper limit value of the vehicle speed V set in advance by, for example, an experiment, for returning from the neutral inertia running mode to the normal running mode during the neutral inertia running mode, and the vehicle speed determination value Va is set smaller than the vehicle speed determination value Vb such that the vehicle speed determination values Va, Vb are set larger than 0 (km/h) (0<Va<Vb). The vehicle speed determination values Va, Vb are the preset upper limit values of the vehicle speed V and correspond to an upper limit value of the magnitude of the negative pressure required for satisfying the amplification effect of the brake booster 42 at the time of a predetermined brake operation, i.e., an upper limit value of the necessity of the brake negative pressure and, for example, when the vehicle speed determination values Va, Vb become larger, this leads to a larger upper limit value of the magnitude of the negative pressure required for satisfying the amplification effect of the brake booster 42 at the time of the predetermined brake operation, i.e., a larger upper limit value of the necessity of the brake negative pressure.

In this example, the vehicle speed V suggests subsequent brake input by a driver or a frequency of the brake input, i.e., indicates the magnitude of the negative pressure required for satisfying the amplification effect of the brake booster 42 at the time of a predetermined brake operation, which is the necessity of the brake negative pressure, and if the vehicle speed V is larger, the possibility of subsequent brake input by a driver becomes higher, increasing the necessity of the brake negative pressure. The vehicle speed determination values Va, Vb are determination values for determining the necessity of the brake negative pressure and, for example, if the vehicle speed V is equal to or less than the vehicle speed determination value Va during the free-run inertia running mode, the driver is less likely to perform subsequent brake input, leading to a lower necessity of the brake negative pressure, while if the vehicle speed V is greater than the vehicle speed determination value Va, the driver is more likely to perform subsequent brake input, leading to a higher necessity of the brake negative pressure. The vehicle speed determining portion 62 is therefore a means of determining the necessity of the brake negative pressure during the free-run inertia running mode or the neutral inertia running mode.

If the inertia running start condition including the returning operation, for example, an accelerator-off operation, of the accelerator pedal 70 is satisfied, the inertia running switching control portion 64 selectively switches a running mode to one of two running modes of the free-run inertia running mode and the neutral inertia running mode based on the vehicle running state and according to a predefined relationship. If an inertia running termination condition is satisfied, the inertia running switching control portion 64 terminates the inertia running mode performed until the satisfaction. If the inertia running start condition is not satisfied, the inertia running switching control portion 64 performs the engine brake running mode (normal running mode).

When the inertia running determining portion 60 determines that the free-run inertia running mode is performed and the vehicle speed determining portion 62 determines that the vehicle speed V is larger than the vehicle speed determination value Va, i.e., that the necessity of the brake negative pressure is relatively large, the inertia running switching control portion 64 restarts the engine 12 and engages the clutch C1 to return from the free-run inertia running mode to the normal running mode. When the inertia running determining portion 60 determines that the free-run inertia running mode is performed and the vehicle speed determining portion 62 determines that the vehicle speed V is equal to or less than the vehicle speed determination value Va, i.e., that the necessity of the brake negative pressure is relatively small, the inertia running switching control portion 64 continues performing the free-run inertia running mode.

When the inertia running determining portion 60 determines that the neutral inertia running mode is performed and the vehicle speed determining portion 62 determines that the vehicle speed V is larger than the vehicle speed determination value Vb, the inertia running switching control portion 64 engages the clutch C1 to return from the neutral inertia running mode to the normal running mode. When the inertia running determining portion 60 determines that the neutral inertia running mode is performed and the vehicle speed determining portion 62 determines that the vehicle speed V is equal to or less than the vehicle speed determination value Vb, the inertia running switching control portion 64 continues performing the neutral inertia running mode.

Figure 4:
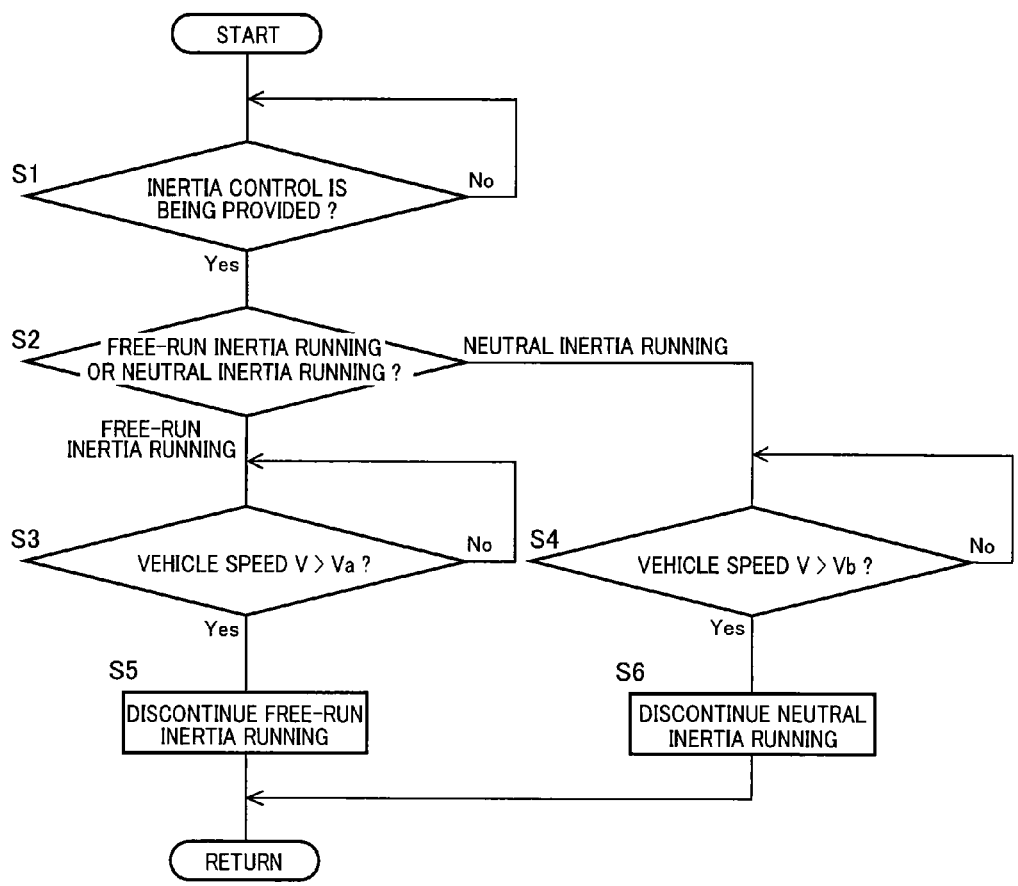
FIG. 4 is a flowchart for explaining a control operation of making a determination of returning from the inertia running mode executed by the electronic control device of FIG. 1.

For a condition of returning from the free-run inertia running mode and the neutral inertia running mode in terms of the vehicle speed V, as depicted in FIG. 3, the upper limit value of the necessity of the brake negative pressure for returning from the free-run inertia running mode, i.e., the vehicle speed determination value (upper limit value) Va of the vehicle speed V, is set smaller than the upper limit value of the necessity of the brake negative pressure for returning from the neutral inertia running mode, i.e., the vehicle speed determination value (upper limit value) Vb of the vehicle speed V (Va<Vb) and, for example, as depicted in (a) of FIG. 4, the lower limit value of the necessity of the brake negative pressure for returning from the free-run inertia running mode, i.e., the lower limit value of the vehicle speed V (e.g., zero), can be set to the same value as the lower limit value of the necessity of the brake negative pressure for returning from the neutral inertia running mode, i.e., the lower limit value of the vehicle speed V (e.g., zero), or as depicted in (b) of FIG. 4, the upper limit value Va of the vehicle speed V for returning from the free-run inertia running mode can be set to the same value as the lower limit value Va of the vehicle speed V for returning from the neutral inertia running mode.

When at least one of the determination conditions of the relatively high-speed steady running state described above in terms of the inertia running determining portion 60 is no longer satisfied and/or when a brake operation is performed, the inertia running switching control portion 64 discontinues the free-run inertia running mode and the neutral inertia running mode so as to switch to the engine brake running mode or another running mode.

Figure 5:
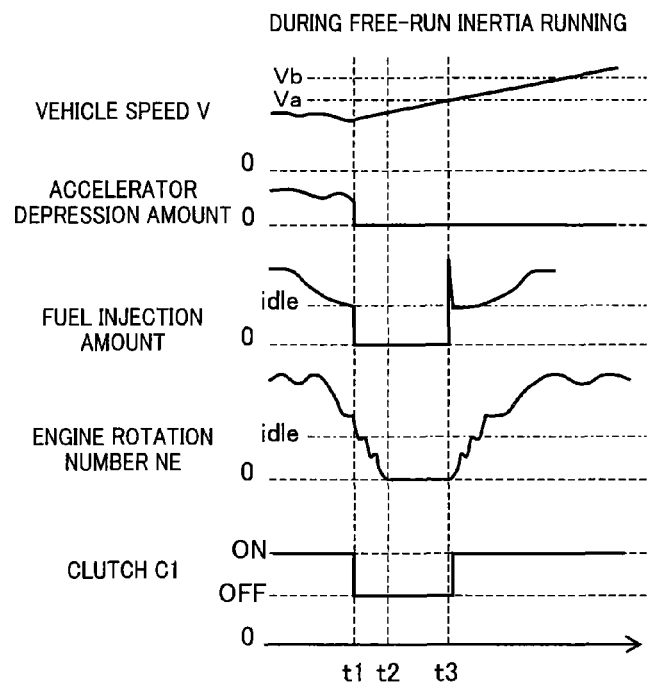
FIG. 5 is a time chart corresponding to the control operation of FIG. 4 and depicts the case of returning from the free-run inertia running mode to the normal running mode because the vehicle speed becomes larger than the vehicle speed determination value for returning from the free-run inertia running mode during the free-run inertia running mode.
Figure 6:
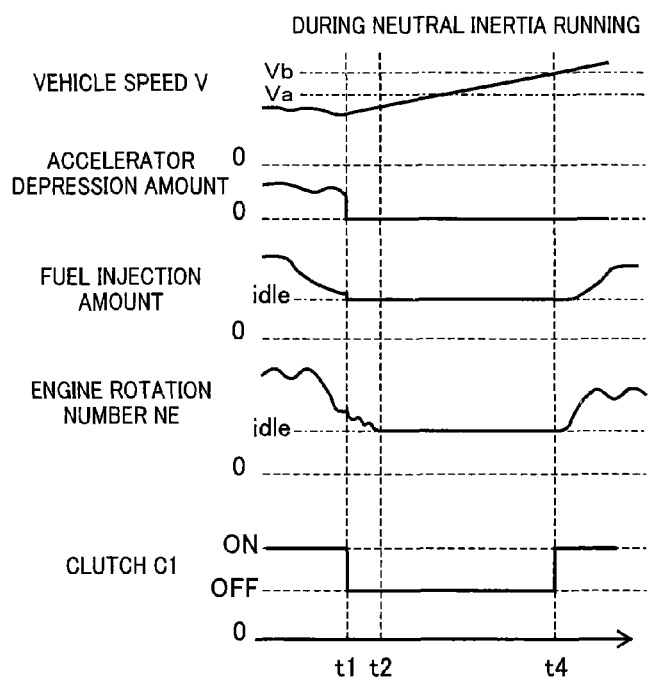
FIG. 6 is a time chart corresponding to the control operation of FIG. 4 and depicts the case of returning from the neutral inertia running mode to the normal running mode because the vehicle speed becomes larger than the vehicle speed determination value for returning from the neutral inertia running mode during the neutral inertia running mode.

FIG. 4 is a flowchart for explaining a main portion of the control operation of the electronic control device 50, i.e., a control operation of making a determination of returning from the free-run inertia running mode or the neutral inertia running mode by the inertia running switching control portion 64 based on the determination by the vehicle speed determining portion 62 and retuning from the inertia running mode to the normal running mode, for example. FIG. 5 is a time chart corresponding to the main portion of the control operation of the electronic control device 50 of FIG. 4 and depicts the case of returning from the free-run inertia running mode to the normal running mode because the vehicle speed V becomes larger than the vehicle speed determination value Va during the free-run inertia running mode. FIG. 6 is a time chart corresponding to the main portion of the control operation of the electronic control device 50 of FIG. 4 and depicts the case of returning from the neutral inertia running mode to the normal running mode because the vehicle speed V becomes larger than the vehicle speed determination value Vb during the neutral inertia running mode.

In FIG. 4, at step S1 (hereinafter, step will be omitted) corresponding to the inertia running determining portion 60, it is determined whether the inertia running start condition is satisfied, i.e., whether the inertia running mode (the free-run inertia running mode or the neutral inertia running mode) is being performed. If the determination of S1 is negative, S1 is repeatedly executed and, for example, if the depression of the accelerator pedal 70 is changed to OFF in the relatively high-speed steady running state as indicated at time t1 of FIG. 5 and time t1 of FIG. 6 to start the inertia running mode, the determination of S1 becomes affirmative and S2 corresponding to the inertia running determining portion 60 is executed.

At S2, it is determined whether the inertia running mode being performed is the free-run inertia running mode or the neutral inertia running mode. If it is determined at S2 that the free-run inertia running mode is executed with the clutch C1 set to OFF and the rotation of the engine 12 stopped as indicated, for example, between t2 and t3 in FIG. 5, S3 corresponding to the vehicle speed determining portion 62 is executed. Alternatively, if it is determined at S2 that the neutral inertia running mode is executed with clutch C1 set to OFF and the engine 12 put into the idle state as indicated, for example, between t2 and t3 in FIG. 6, S4 corresponding to the vehicle speed determining portion 62 is executed.

At S3, it is determined whether the vehicle speed V is larger than the vehicle speed determination value Va, i.e., whether the possibility of subsequent brake input by a driver is high and the necessity of the brake negative pressure is relatively large. If the determination of S3 is negative, S3 is repeatedly executed and, for example, if the vehicle speed V becomes larger than the vehicle speed determination value Va at time t3 of FIG. 5 and the determination of S3 becomes affirmative, S5 corresponding to the inertia running switching control portion 64 is executed. At S5, fuel ignition is started as indicated at time t3 of FIG. 5 and the clutch C1 is subsequently engaged for returning from the free-run inertia running mode to the normal running mode.

At S4, it is determined whether the vehicle speed V is larger than the vehicle speed determination value Vb. If the determination of S4 is negative, S4 is repeatedly executed and, for example, if the vehicle speed V becomes larger than the vehicle speed determination value Vb at time t4 of FIG. 6 and the determination of S4 becomes affirmative, S6 corresponding to the inertia running switching control portion 64 is executed. At S6, the clutch C1 is engaged as indicated at time t4 of FIG. 6 for returning from the neutral inertia running mode to the normal running mode.

For example, if the free-run inertia running mode is uniformly performed to put importance only on fuel consumption unlike the control operation of the electronic control device 50 of this example, the brake force possibly runs short during running requiring the brake negative pressure and, for example, the shortage needs to be compensated for by separately disposing an electronically controlled brake (ECB etc.) generating a brake force other than the brake negative pressure or a negative pressure pump acting as a negative pressure source of the brake booster 42, leading to a cost increase. As in the control operation of the electronic control device 50 of this example, however, by continuing the free-run inertia running mode or returning from the free-run inertia running mode to the normal running mode depending on whether the vehicle speed V is larger than the vehicle speed determination value Va, i.e., whether the necessity of the brake negative pressure is large in accordance with the vehicle speed determining portion 62, the need for an ECB device and a negative pressure pump is eliminated or the use thereof can be suppressed, which enables miniaturization, and therefore, the cost increase can be suppressed.

As described above, according to the electronic control device 50 included in the vehicle drive device 10 of this example, the vehicle speed determination value Va of the vehicle speed V for returning from the free-run inertia running mode to the normal running mode is set smaller than the vehicle speed determination value Vb of the vehicle speed V for returning from the neutral inertia running mode to the normal running mode. Since this allows the inertia running switching control portion 64 having the vehicle speed determining portion 62 to perform the neutral inertia running mode with the engine 12 rotated when the vehicle speed V is larger than the vehicle speed determination value Va and the necessity of the brake negative pressure is relatively large, the engine 12 rotates when braking is required, thereby ensuring the brake negative pressure. When the vehicle speed V is equal to or less than the vehicle speed determination value Va and the necessity of the brake negative pressure is relatively small, the free-run inertia running mode with the engine 12 stopped can be performed and, therefore, the inertia running mode can be performed with good fuel consumption. As a result, the vehicle fuel consumption can be improved and the brake negative pressure can be ensured when braking is required at the same time during the inertia running mode of the vehicle.

According to the electronic control device 50 included in the vehicle drive device 10 of this example, the vehicle speed determining portion 62 determines that the necessity of the brake negative pressure is large when the vehicle speed V is larger than the vehicle speed determination value Va during running of the vehicle. Therefore, the vehicle speed determining portion 62 can predict subsequent brake input by a driver during the inertia running mode or a frequency of the brake input from the vehicle speed V and can preferably ensure the stability of the brake input at the time of braking.

According to the electronic control device 50 included in the vehicle drive device 10 of this example, the free-run inertia running mode is the inertia running mode performed by disconnecting the power transmission path between the engine 12 and the drive wheels 20 and stopping the engine 12 during running, and the neutral inertia running mode is the inertia running mode performed by disconnecting the power transmission path between the engine 12 and the drive wheels 20 and operating the engine 12 in a self-sustaining manner during running. Since therefore the power transmission path between the engine 12 and the drive wheels 20 is disconnected during the free-run inertia running mode and the neutral inertia running mode, the engine brake force is almost eliminated and the running distance in the inertia running mode is preferably extended.

According to the electronic control device 50 included in the vehicle drive device 10 of this example, if the vehicle speed V becomes larger during the free-run inertia running mode than the vehicle speed determination value Va for returning from the free-run inertia running mode, the vehicle returns from the free-run inertia running mode to the normal running mode, while if the vehicle speed V becomes larger during the neutral inertia running mode than the vehicle speed determination value Vb for returning from the neutral inertia running mode, the vehicle returns from the neutral inertia running mode to the normal running mode, and therefore, the brake negative pressure can preferably be ensured when braking is required during the inertia running mode of the vehicle.

Another example of the present invention will be described in detail based on the drawings. In the following description, the portions mutually common to the examples are denoted by the same reference numerals and will not be described.

SECOND EXAMPLE

Figure 7:
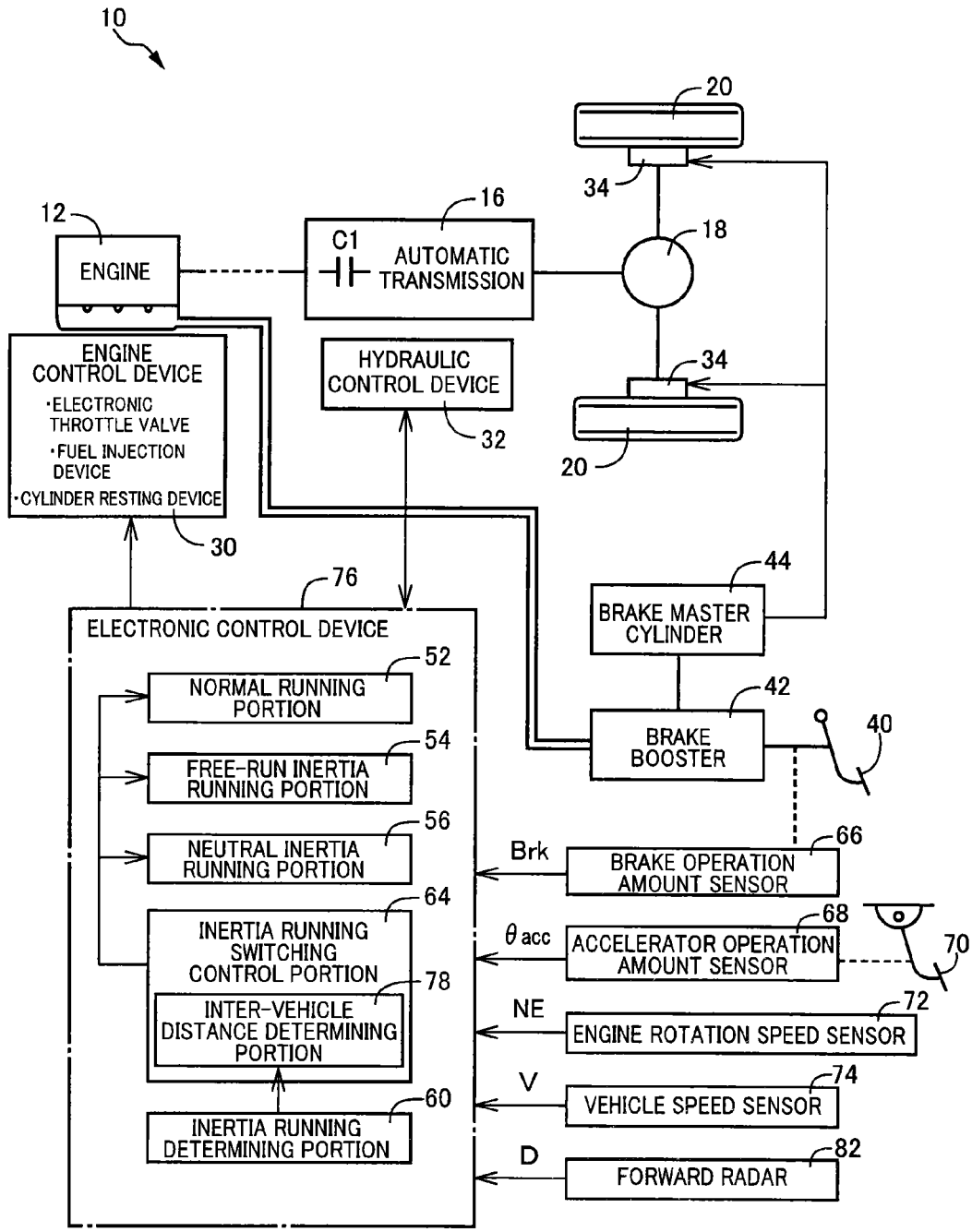
FIG. 7 is a diagram for indicating an electronic control device of a vehicle drive device indicative of another example of the present invention, and corresponds to FIG. 1.
Figure 8:
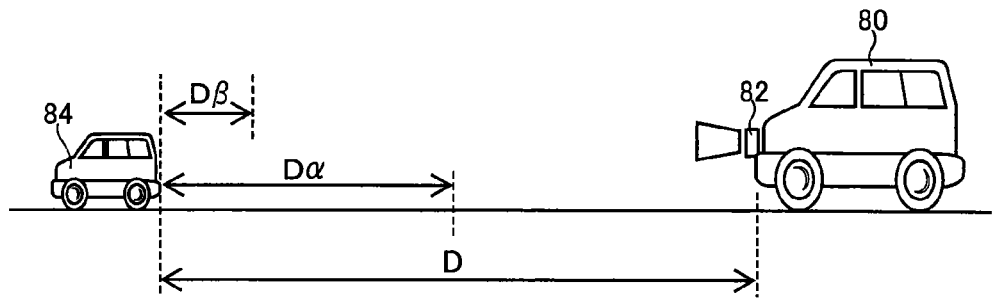
FIG. 8 is a diagram for indicating an inter-vehicle distance to a preceding vehicle in an inter-vehicle distance determining portion disposed in the electronic control device of FIG. 7.

As depicted in FIG. 7, an electronic control device (running control device) 76 of the vehicle drive device 10 of this example is different from the electronic control device 50 of the first example in that the vehicle speed determining portion 62 disposed in the electronic control device 50 is replaced with an inter-vehicle distance determining portion 78, and is substantially the same as the electronic control device 50 of the first example except this point. As depicted in FIGS. 7 and 8, the vehicle drive device 10 has the electronic control device 76 supplied with a signal indicative of an inter-vehicle distance (distance) D to a preceding vehicle 84 by a forward radar 82 disposed on a front portion of a vehicle 80.

The inter-vehicle distance determining portion 78 determines whether the inter-vehicle distance D detected by the forward radar 82 is equal to or less than a preset inter-vehicle distance determination value Dα and whether the inter-vehicle distance D detected by the forward radar 82 is equal to or less than a preset inter-vehicle distance determination value Dβ. The inter-vehicle distance determination value Dα is a lower limit value of the inter-vehicle distance D set in advance by, for example, an experiment, for returning from the free-run inertia running mode to the normal running mode during the free-run inertia running mode, while the inter-vehicle distance determination value Dβ is a lower limit value of the inter-vehicle distance D set in advance by, for example, an experiment, for returning from the neutral inertia running mode to the normal running mode during the neutral inertia running mode, and the inter-vehicle distance determination value Dβ is set smaller than the inter-vehicle distance determination value Dα. The inter-vehicle distance determination values Dα, Dβ are the preset lower limit values of the inter-vehicle distance D and correspond to an upper limit value of the magnitude of the negative pressure required for satisfying the amplification effect of the brake booster 42 at the time of a predetermined brake operation, i.e., an upper limit value of the necessity of the brake negative pressure and, for example, when the inter-vehicle distance determination values Dα, Dβ become smaller, this leads to a larger upper limit value of the magnitude of the negative pressure required for satisfying the amplification effect of the brake booster 42 at the time of the predetermined brake operation, i.e., a larger upper limit value of the necessity of the brake negative pressure.

In this example, the inter-vehicle distance D is used to predict subsequent brake input by a driver avoiding a collision with the preceding vehicle 84 or a frequency of the brake input, i.e., indicates the magnitude of the negative pressure required for satisfying the amplification effect of the brake booster 42 at the time of a predetermined brake operation, which is the necessity of the brake negative pressure, and if the inter-vehicle distance D is closer, the possibility of subsequent brake input by a driver becomes higher, increasing the necessity of the brake negative pressure. The inter-vehicle distance determination values Dα, Dβ are determination values for determining the necessity of the brake negative pressure and, for example, if the inter-vehicle distance D is larger than the inter-vehicle distance determination value Dα during the free-run inertia running mode, the driver is less likely to perform subsequent brake input, leading to a lower necessity of the brake negative pressure, while if the inter-vehicle distance D is equal to or less than the inter-vehicle distance determination value Dα, the driver is more likely to perform subsequent brake input, leading to a higher necessity of the brake negative pressure. The inter-vehicle distance determining portion 78 is therefore a means of determining the necessity of the brake negative pressure during the free-run inertia running mode or the neutral inertia running mode.

When the inertia running determining portion 60 determines that the free-run inertia running mode is performed and the inter-vehicle distance determining portion 78 determines that the inter-vehicle distance D is equal to or less than the inter-vehicle distance determination value Dα, i.e., that the necessity of the brake negative pressure is relatively large, the inertia running switching control portion 64 having the inter-vehicle distance determining portion 78 restarts the engine 12 and engages the clutch C1 to return from the free-run inertia running mode to the normal running mode. When the inertia running determining portion 60 determines that the free-run inertia running mode is performed and the inter-vehicle distance determining portion 78 determines that the inter-vehicle distance D is larger than the inter-vehicle distance determination value Dα, i.e., that the necessity of the brake negative pressure is relatively small, the inertia running switching control portion 64 continues performing the free-run inertia running mode.

When the inertia running determining portion 60 determines that the neutral inertia running mode is performed and the inter-vehicle distance determining portion 78 determines that the inter-vehicle distance D is equal to or less than the inter-vehicle distance determination value Dβ, the inertia running switching control portion 64 having the inter-vehicle distance determining portion 78 engages the clutch C1 to return from the neutral inertia running mode to the normal running mode. When the inertia running determining portion 60 determines that the neutral inertia running mode is performed and the inter-vehicle distance determining portion 78 determines that the inter-vehicle distance D is larger than the inter-vehicle distance determination value Dβ, the inertia running switching control portion 64 continues performing the neutral inertia running mode.

Figure 9:
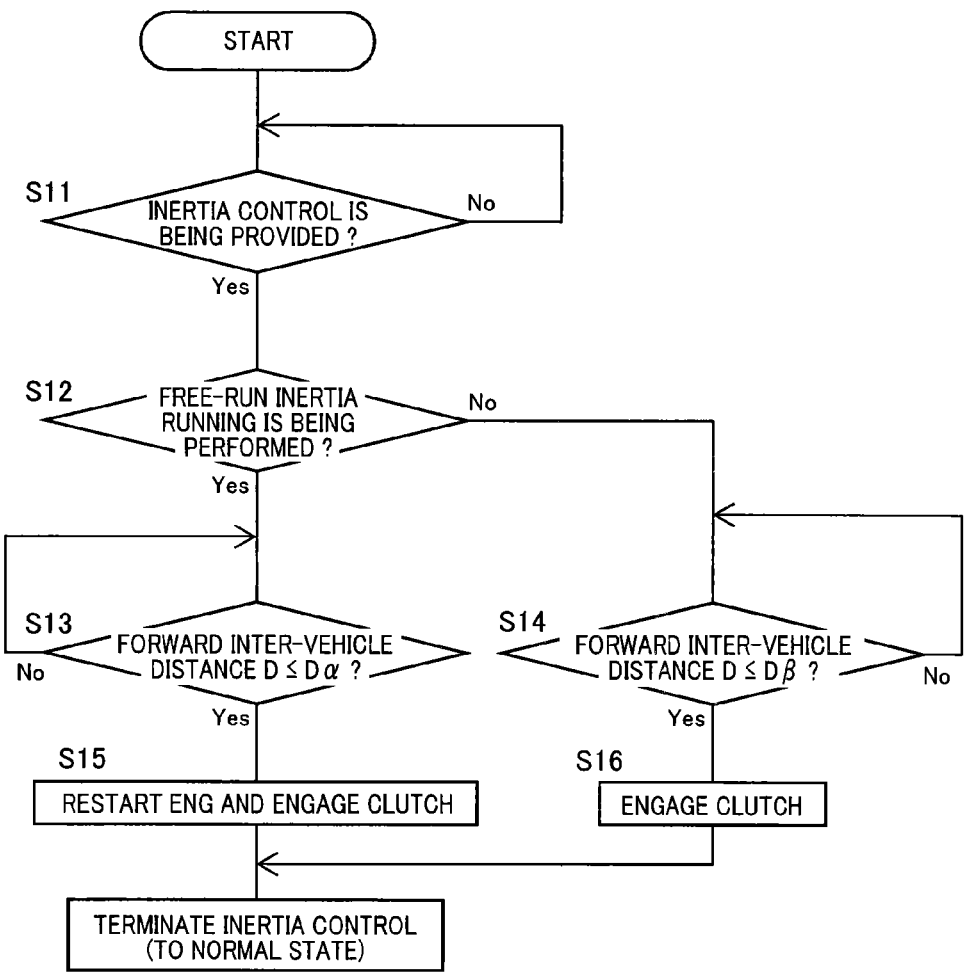
FIG. 9 is a flowchart for explaining a control operation of making a determination of returning from the inertia running mode executed by the electronic control device of FIG. 7.

FIG. 9 is a flowchart for explaining a main portion of the control operation of the electronic control device 76, i.e., a control operation of making a determination of returning from the free-run inertia running mode or the neutral inertia running mode by the inertia running switching control portion 64 based on the determination by the inter-vehicle distance determining portion 78 and retuning from the inertia running mode to the normal running mode. FIG. 10 is a time chart corresponding to the main portion of the control operation of the electronic control device 76 of FIG. 9 and depicts the case of returning from the free-run inertia running mode to the normal running mode because the inter-vehicle distance D becomes equal to or less than the inter-vehicle distance determination value Dα during the free-run inertia running mode. FIG. 11 is a time chart corresponding to the main portion of the control operation of the electronic control device 76 of FIG. 9 and depicts the case of returning from the neutral inertia running mode to the normal running mode because the inter-vehicle distance D becomes equal to or less than the inter-vehicle distance determination value Dβ during the neutral inertia running mode.

In FIG. 9, at S11 corresponding to the inertia running determining portion 60, it is determined whether the inertia running start condition is satisfied, i.e., whether the inertia running mode (the free-run inertia running mode or the neutral inertia running mode) is being performed. If the determination of S11 is negative, S11 is repeatedly executed and, for example, if the depression of the accelerator pedal 70 is changed to OFF in the relatively high-speed steady running state to start the inertia running mode, the determination of S11 becomes affirmative and S12 corresponding to the inertia running determining portion 60 is executed.

At S12, it is determined whether the inertia running mode being performed is the free-run inertia running mode. If it is determined at S12 that the free-run inertia running mode is executed with the clutch C1 set to OFF and the fuel injection set to OFF as indicated, for example, between t1 and t2 in FIG. 10, the determination of S12 is affirmative and S13 corresponding to the inter-vehicle distance determining portion 78 is executed. Alternatively, if it is determined at S12 that the neutral inertia running mode is executed with clutch C1 set to OFF and the engine 12 put into the idle state as indicated, for example, between t3 and t4 in FIG. 11, the determination of S12 is negative and S14 corresponding to the inter-vehicle distance determining portion 78 is executed.

At S13, it is determined whether the inter-vehicle distance D is equal to or less than the inter-vehicle distance determination value Dα, i.e., whether the possibility of subsequent brake input by a driver is high and the necessity of the brake negative pressure is relatively large. If the determination of S13 is negative, S13 is repeatedly executed and, for example, if the inter-vehicle distance D becomes equal to or less than the inter-vehicle distance determination value Dα at time t2 of FIG. 10 and the determination of S13 becomes affirmative, S15 corresponding to the inertia running switching control portion 64 is executed. At S15, fuel ignition is started to restart the engine 12 as indicated after time t2 of FIG. 10 and the clutch C1 is subsequently set to ON for returning from the free-run inertia running mode to the normal running mode.

At S14, it is determined whether the inter-vehicle distance D is equal to or less than the inter-vehicle distance determination value Dβ. If the determination of S14 is negative, S14 is repeatedly executed and, for example, if the inter-vehicle distance D becomes equal to or less than the inter-vehicle distance determination value Dβ at time t4 of FIG. 11 and the determination of S14 becomes affirmative, S16 corresponding to the inertia running switching control portion 64 is executed. At S16, the clutch C1 is set to ON as indicated at time t4 of FIG. 11 for returning from the neutral inertia running mode to the normal running mode.

As described above, according to the electronic control device 76 included in the vehicle drive device 10 of this example, the inter-vehicle distance determining portion 78 determines that the necessity of the brake negative pressure is relatively large when the inter-vehicle distance D to the preceding vehicle 84 is equal to or less than the inter-vehicle distance determination value Dα. Therefore, the inter-vehicle distance determining portion 78 can predict subsequent brake input by a driver during the inertia running mode or a frequency of the brake input from the inter-vehicle distance D to the preceding vehicle 84 and can preferably ensure the stability of the brake input at the time of braking.

THIRD EXAMPLE

Figure 13:
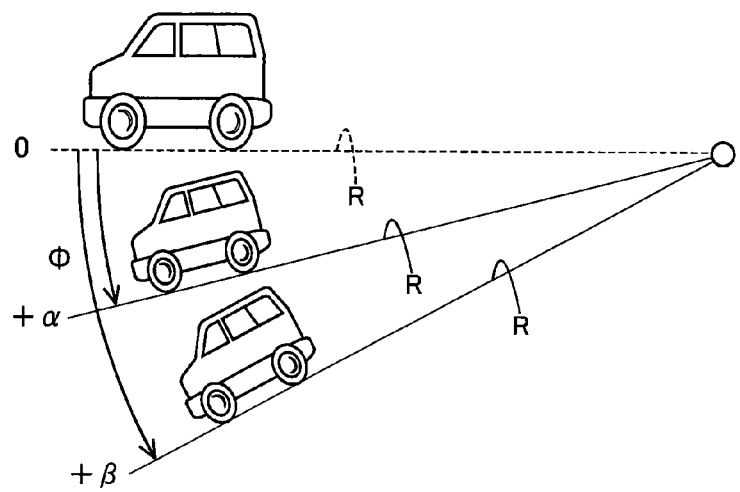
FIG. 13 is a diagram for indicating a down-gradient of a road surface in a down-gradient determining portion disposed in the electronic control device of FIG. 12.

As depicted in FIG. 12, an electronic control device (running control device) 86 of the vehicle drive device 10 of this example is different from the electronic control device 50 of the first example in that the vehicle speed determining portion 62 disposed in the electronic control device 50 is replaced with a down-gradient determining portion 88, and is substantially the same as the electronic control device 50 of the first example except this point. The electronic control device 86 is supplied with a signal indicative of a down-gradient (gradient) Φ (angle) of a road surface R from a road gradient sensor 90 detecting a longitudinal acceleration, for example. The down-gradient Φ is a positive value on a down-slope as depicted in FIG. 13 and is a negative value on an up-slope.

The down-gradient determining portion 88 determines whether the down-gradient Φ detected by the road gradient sensor 90 is equal to or greater than a preset gradient determination value α and whether the down-gradient Φ detected by the road gradient sensor 90 is equal to or greater than a preset gradient determination value β. The gradient determination value α is an upper limit value of the down-gradient Φ set in advance by, for example, an experiment, for returning from the free-run inertia running mode to the normal running mode during the free-run inertia running mode, while the gradient determination value β is an upper limit value of the down-gradient Φ set in advance by, for example, an experiment, for returning from the neutral inertia running mode to the normal running mode during the neutral inertia running mode, and the gradient determination value α is set smaller than the gradient determination value β. The gradient determination values α, β are the preset upper limit values of the down-gradient Φ and correspond to an upper limit value of the magnitude of the negative pressure required for satisfying the amplification effect of the brake booster 42 at the time of a predetermined brake operation, i.e., an upper limit value of the necessity of the brake negative pressure and, for example, when the gradient determination values α, β become larger, this leads to a larger upper limit value of the magnitude of the negative pressure required for satisfying the amplification effect of the brake booster 42 at the time of the predetermined brake operation, i.e., a larger upper limit value of the necessity of the brake negative pressure.

In this example, the down-gradient Φ is used to predict subsequent brake input by a driver or a frequency of the brake input, i.e., indicates the magnitude of the negative pressure required for satisfying the amplification effect of the brake booster 42 at the time of a predetermined brake operation, which is the necessity of the brake negative pressure, and if the down-gradient Φ is larger, the possibility of subsequent brake input by a driver becomes higher, increasing the necessity of the brake negative pressure. The gradient determination values α, β are determination values for determining the necessity of the brake negative pressure and, for example, if the down-gradient Φ is smaller than the gradient determination value α during the free-run inertia running mode, the driver is less likely to perform subsequent brake input, leading to a lower necessity of the brake negative pressure, while if the down-gradient Φ is equal to or greater than the gradient determination value α, the driver is more likely to perform subsequent brake input, leading to a higher necessity of the brake negative pressure. The down-gradient determining portion 88 is therefore a means of determining the necessity of the brake negative pressure during the free-run inertia running mode or the neutral inertia running mode.

When the inertia running determining portion 60 determines that the free-run inertia running mode is performed and the down-gradient determining portion 88 determines that the down-gradient Φ is equal to or greater than the gradient determination value α, i.e., that the necessity of the brake negative pressure is relatively large, the inertia running switching control portion 64 having the down-gradient determining portion 88 restarts the engine 12 and engages the clutch C1 to return from the free-run inertia running mode to the normal running mode. When the inertia running determining portion 60 determines that the free-run inertia running mode is performed and the down-gradient determining portion 88 determines that the down-gradient Φ is smaller than the gradient determination value α, i.e., that the necessity of the brake negative pressure is relatively small, the inertia running switching control portion 64 continues performing the free-run inertia running mode.

When the inertia running determining portion 60 determines that the neutral inertia running mode is performed and the down-gradient determining portion 88 determines that the down-gradient Φ is equal to or greater than the gradient determination value β, the inertia running switching control portion 64 having the down-gradient determining portion 88 engages the clutch C1 to return from the neutral inertia running mode to the normal running mode. When the inertia running determining portion 60 determines that the neutral inertia running mode is performed and the down-gradient determining portion 88 determines that the down-gradient Φ is smaller than the gradient determination value β, the inertia running switching control portion 64 continues performing the neutral inertia running mode.

Figure 14:
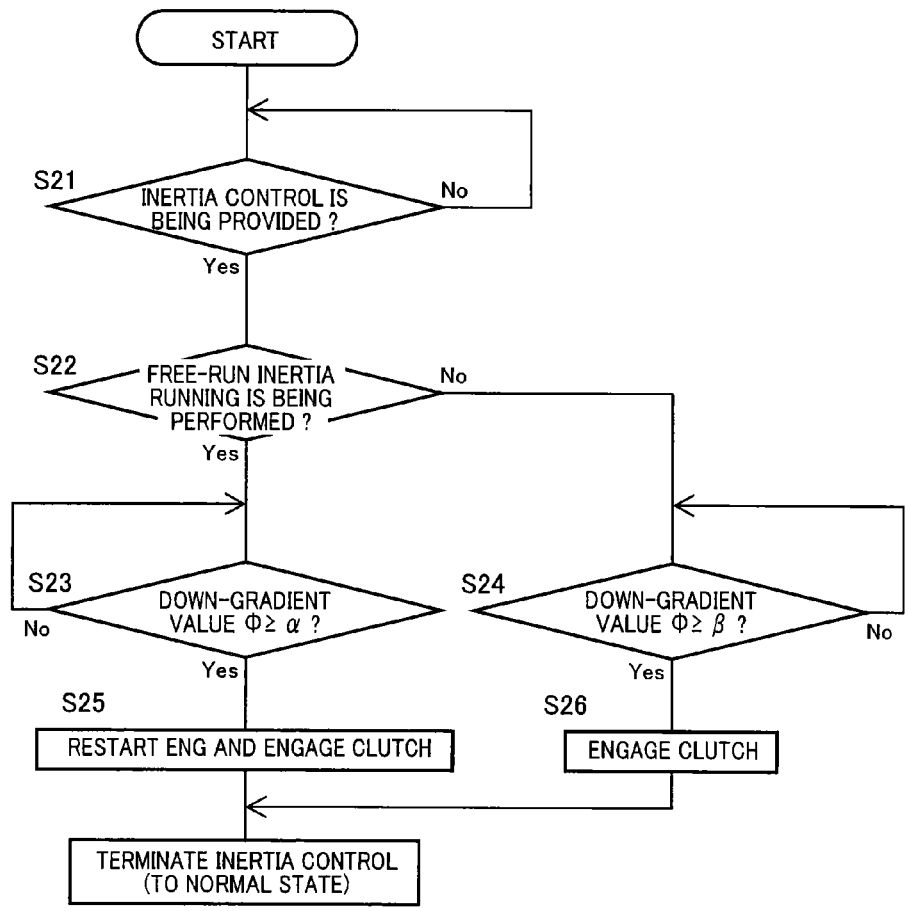
FIG. 14 is a flowchart for explaining a control operation of making a determination of returning from the inertia running mode executed by the electronic control device of FIG. 12.
Figure 15:
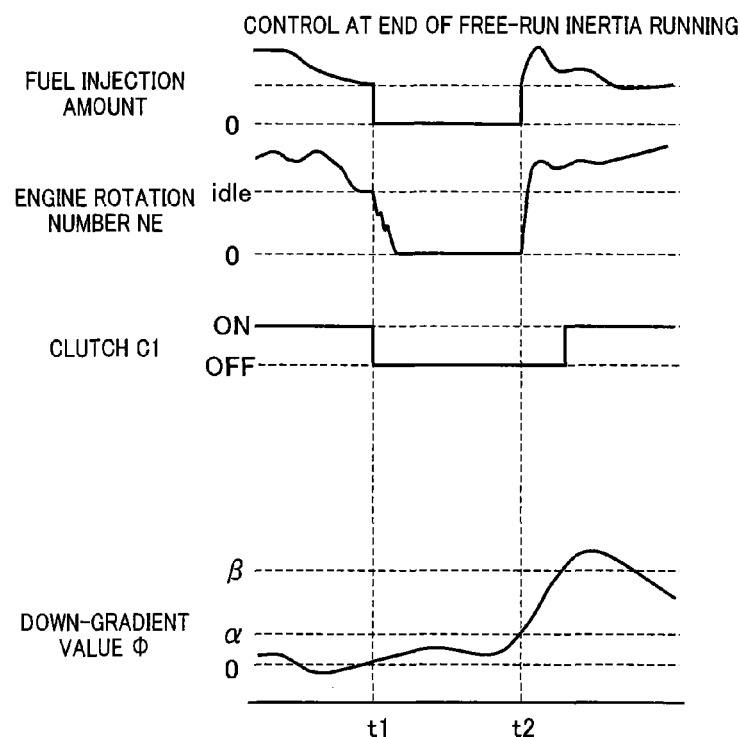
FIG. 15 is a time chart corresponding to the control operation of FIG. 14 and depicts the case of returning from the free-run inertia running mode to the normal running mode because the down-gradient becomes equal to or greater than a gradient determination value for returning from the free-run inertia running mode during the free-run inertia running mode.
Figure 16:
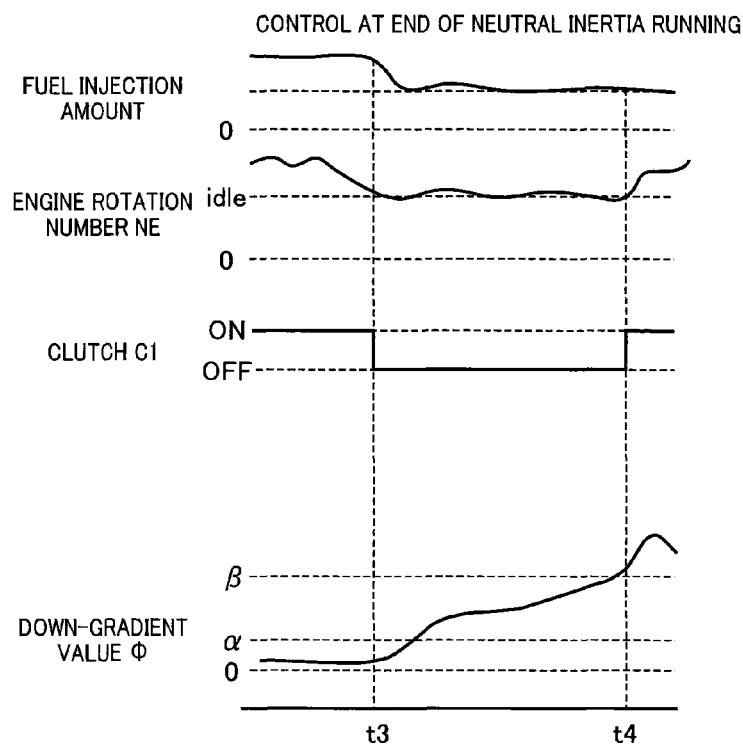
FIG. 16 is a time chart corresponding to the control operation of FIG. 14 and depicts the case of returning from the neutral inertia running mode to the normal running mode because the down-gradient becomes equal to or greater than a gradient determination value for returning from the neutral inertia running mode during the neutral inertia running mode.

FIG. 14 is a flowchart for explaining a main portion of the control operation of the electronic control device 86, i.e., a control operation of making a determination of returning from the free-run inertia running mode or the neutral inertia running mode by the inertia running switching control portion 64 based on the determination by the down-gradient determining portion 88 and retuning from the inertia running mode to the normal running mode. FIG. 15 is a time chart corresponding to the main portion of the control operation of the electronic control device 86 of FIG. 14 and depicts the case of returning from the free-run inertia running mode to the normal running mode because the down-gradient Φ becomes equal to or greater than the gradient determination value α during the free-run inertia running mode. FIG. 16 is a time chart corresponding to the main portion of the control operation of the electronic control device 86 of FIG. 14 and depicts the case of returning from the neutral inertia running mode to the normal running mode because the down-gradient Φ becomes equal to or greater than the gradient determination value β during the neutral inertia running mode.

In FIG. 14, at S21 corresponding to the inertia running determining portion 60, it is determined whether the inertia running start condition is satisfied, i.e., whether the inertia running mode (the free-run inertia running mode or the neutral inertia running mode) is being performed. If the determination of S21 is negative, S21 is repeatedly executed and, for example, if the depression of the accelerator pedal 70 is changed to OFF in the relatively high-speed steady running state to start the inertia running mode, the determination of S21 becomes affirmative and S22 corresponding to the inertia running determining portion 60 is executed.

At S22, it is determined whether the inertia running mode being performed is the free-run inertia running mode. If it is determined at S22 that the free-run inertia running mode is executed with the clutch C1 set to OFF and the fuel injection set to OFF as indicated, for example, between t1 and t2 in FIG. 15, the determination of S22 is affirmative and S23 corresponding to the down-gradient determining portion 88 is executed. Alternatively, if it is determined at S22 that the neutral inertia running mode is executed with the clutch C1 set to OFF and the engine 12 put into the idle state as indicated, for example, between t3 and t4 in FIG. 16, the determination of S22 is negative and S24 corresponding to the down-gradient determining portion 88 is executed.

At S23, it is determined whether the down-gradient Φ is equal to or greater than the gradient determination value α, i.e., whether the possibility of subsequent brake input by a driver is high and the necessity of the brake negative pressure is relatively large. If the determination of S23 is negative, S23 is repeatedly executed and, for example, if the down-gradient Φ becomes equal to or greater than the gradient determination value α, i.e., the necessity of the brake negative pressure becomes relatively large, at time t2 of FIG. 15 and the determination of S23 becomes affirmative, S25 corresponding to the inertia running switching control portion 64 is executed. At S25, fuel ignition is started to restart the engine 12 as indicated after time t2 of FIG. 15 and the clutch C1 is subsequently engaged for returning from the free-run inertia running mode to the normal running mode.

At S24, it is determined whether the down-gradient Φ is equal to or greater than the gradient determination value β. If the determination of S24 is negative, S24 is repeatedly executed and, for example, if the down-gradient Φ becomes equal to or greater than the gradient determination value β at time t4 of FIG. 16 and the determination of S24 becomes affirmative, S26 corresponding to the inertia running switching control portion 64 is executed. At S26, the clutch C1 is engaged as indicated at time t4 of FIG. 16 for returning from the neutral inertia running mode to the normal running mode.

As described above, according to the electronic control device 86 included in the vehicle drive device 10 of this example, the down-gradient determining portion 88 determines that the necessity of the brake negative pressure is relatively large when the down-gradient Φ is equal to or greater than the gradient determination value α on the road surface R where the vehicle is running. Therefore, the down-gradient determining portion 88 can predict subsequent brake input by a driver during the inertia running mode or a frequency of the brake input from the down-gradient Φ of the road surface R and can preferably ensure the stability of the brake input at the time of braking.

Although the examples of the present invention have been described in detail with reference to the drawings, the present invention is also applied in other forms.

Although the neutral inertia running mode is used as the second inertia running mode performed with the engine 12 kept rotating and the engine brake force reduced as compared to the normal running mode in the examples, the second inertia running mode may be, for example, cylinder resting inertia running mode in which the fuel supply to the engine 12 is stopped with the engine 12 coupled to the drive wheels 20 while the cylinder resting device stops operation of at least one of a piston and intake/exhaust valves in a part of the multiple cylinders of the engine 12. As a result, since a pumping loss is reduced when the engine 12 is driven to rotate in the fuel cut state and the engine brake force is reduced as compared to the normal running mode, the running distance in the inertia running mode is extended.

In the examples, the necessity of the brake negative pressure is indicated by the vehicle speed V in the first example, by the inter-vehicle distance D in the second example, and by the down-gradient Φ in the third example; however, the necessity of the brake negative pressure may be indicated as a magnitude of the negative pressure required for satisfying the amplification effect of the brake booster 42 at the time of a predetermined brake operation. For example, when the vehicle speed V becomes higher, when the inter-vehicle distance D becomes closer, or when the down-gradient Φ becomes larger, a magnitude increases in the negative pressure required for satisfying the amplification effect of the brake booster 42 at the time of a predetermined brake operation.

Although the down-gradient Φ is obtained by the road gradient sensor 90 such as a G-sensor detecting a longitudinal acceleration in the examples, a means of acquiring information of the down-gradient Φ is not limited to the road gradient sensor 90. For example, the down-gradient Φ may be obtained based on actual drive force or throttle valve opening degree of the engine 12 and vehicle speed from a preliminarily stored relationship between a drive force or a throttle valve opening degree of the engine 12 and a vehicle speed on a flat road, or based on an actual location from preliminarily stored map information.

Although the vehicle speed determination values Va, Vb, the inter-vehicle distance determination values Dα, Dβ, and the gradient determination values α, β are predefined constant values in the examples, the vehicle speed determination values Va, Vb, the inter-vehicle distance determination values Dα, Dβ, and the gradient determination values α, β may be a function of a vehicle state such as a battery remaining amount, an engine water temperature, or a necessity of an oil pressure, for example, and the determination values may variably be set in consideration thereof. The variable setting may vary the vehicle speed determination values Va, Vb, the inter-vehicle distance determination values Dα, Dβ, and the gradient determination values α, β continuously or in stages including two stages, and is defined in advance based on a data map, a computing equation, etc. For example, the function is set such that the vehicle speed determination values Va, Vb and the gradient determination values α, β become smaller in accordance with a reduction in the battery remaining amount or the engine water temperature or an increase in the necessity of an oil pressure. The function is set such that the inter-vehicle distance determination values Dα, Dβ become larger in accordance with a reduction in the battery remaining amount or the engine water temperature or an increase in the necessity of an oil pressure.

In the examples, when it is determined during the free-run inertia running mode that the vehicle speed V is larger than the vehicle speed determination value Va, or that the inter-vehicle distance D is equal to or less than the inter-vehicle distance determination value Dα, or that the down-gradient Φ is equal to or greater than the gradient determination value α, the vehicle returns from the free-run inertia running mode to the normal running mode; however, for example, when it is determined during the free-run inertia running mode that the vehicle speed V is larger than the vehicle speed determination value Va, or that the inter-vehicle distance D is equal to or less than the inter-vehicle distance determination value Dα, or that the down-gradient Φ to is equal to or greater than the gradient determination value α, the vehicle may return from the free-run inertia running mode to the neutral inertia running mode. As a result, for example, as compared to the examples, when the vehicle speed V is within a range larger than the vehicle speed determination value Va and equal to or less than the vehicle speed determination value Vb, or when the inter-vehicle distance D is within a range larger than the inter-vehicle distance determination value Dβ and equal to or less than the inter-vehicle distance determination value Dα, or when the down-gradient Φ is within a range equal to or greater than the gradient determination value α and smaller than the gradient determination value β, the neutral inertia running mode is performed with the power transmission path between the engine 12 and the drive wheels disconnected and, therefore, the vehicle fuel consumption is preferably improved during the inertia running mode of the vehicle.

In the electronic control devices 50, 76, and 86 of the examples, when the vehicle speed V is equal to or less than the vehicle speed determination value Va (Va≤V), or when the inter-vehicle distance D is smaller than the inter-vehicle distance determination value Dα(D<Dα), or when the down-gradient Φ is smaller than the gradient determination value α (Φ<α), both the neutral inertia running mode and the free-run inertia running mode can be performed; however, for example, when the vehicle speed V is equal to or less than the vehicle speed determination value Va, or when the inter-vehicle distance D is smaller than the inter-vehicle distance determination value Dα, or when the down-gradient Φ is smaller than the gradient determination value α, control may be provided such that the free-run inertia running mode is selected. As a result, the free-run inertia running mode is selected at a place where the necessity of the brake negative pressure is relatively small and, therefore, the inertia running mode can be performed with good fuel consumption.

The above description is merely an embodiment and the present invention can be implemented in variously modified and improved forms based on the knowledge of those skilled in the art.

Nomenclature of Elements

12: engine 20: drive wheels 42: brake booster 50, 76, 86: electronic control device (running control device) 52: normal running portion 54: free-run inertia running portion 56: neutral inertia running portion 62: vehicle speed determining portion 64: inertia running switching control portion 78: inter-vehicle distance determining portion 84: preceding vehicle 88: down-gradient determining portion D: inter-vehicle distance R: road surface V: vehicle speed Φ: down-gradient Va, Vb: vehicle speed determination value (upper limit value) Dα, Dβ: inter-vehicle distance determination value (upper limit value) α,β: gradient determination value (upper limit value)

The invention claimed is:

1. A running control device of a vehicle including an engine and a brake booster amplifying a brake force by using a brake negative pressure generated by rotation of the engine, the running control device of a vehicle executing a normal running mode with the engine coupled to drive wheels, a first inertia running mode with the engine stopped during running and an engine brake force reduced as compared to the normal running mode, and a second inertia running mode with the engine kept rotating during running and the engine brake force reduced as compared to the normal running mode, the running control device of a vehicle comprising a determining portion configured to determine a necessity of the brake negative pressure during the first or second inertia running mode, the necessity of the brake negative pressure being included as at least one of conditions for returning from the first inertia running mode and the second inertia running mode to the normal running mode, the running control device of a vehicle having an upper limit value of the necessity of the brake negative pressure for returning from the first inertia running mode set smaller than an upper limit value of the necessity of the brake negative pressure for returning from the second inertia running mode, wherein the necessity of the brake negative pressure is a magnitude of a negative pressure required for satisfying an amplification effect of the brake booster at the time of a predetermined brake operation.

2. The inning control device of a vehicle of claim 1, wherein the determining portion determines the necessity of the brake negative pressure such that the necessity of the brake negative pressure is larger as a distance to a preceding vehicle is closer, such that the necessity of the brake negative pressure is larger as a down-gradient is larger on a road surface where the vehicle is running, or such that the necessity of the brake negative pressure is larger as a vehicle speed is larger when the vehicle is running.

3. The running control device of a vehicle of claim 1, wherein the first inertia running mode is a free-run inertia running mode that is an inertia running mode performed by disconnecting the engine and the drive wheels and stopping the engine during running, and wherein the second inertia running mode is a neutral inertia running mode that is an inertia running mode performed by disconnecting the engine and the drive wheels and operating the engine in a self-sustaining manner during running.

4. The running control device of a vehicle of claim 1, wherein the first inertia running mode is a free-run inertia running mode that is an inertia running mode performed by disconnecting the engine and the drive wheels and stopping the engine during running, and wherein the second inertia running mode is a cylinder resting inertia running mode performed by stopping a fuel supply to the engine with the engine coupled to the drive wheels and stopping operation of at least one of a piston and intake/exhaust valves in a part of multiple cylinders of the engine.

* * * * *